April 13, 1965     H. W. BROWN, SR     3,177,745
SPINDLE CENTER AND DRIVER

Filed Sept. 25, 1962     2 Sheets-Sheet 1

INVENTOR.
HARRY W. BROWN, SR.
BY *Woodling, Krost,*
*Granger and Rust*
ATTORNEYS April 13, 1965   H. W. BROWN, SR   3,177,745
SPINDLE CENTER AND DRIVER
Filed Sept. 25, 1962   2 Sheets-Sheet 2
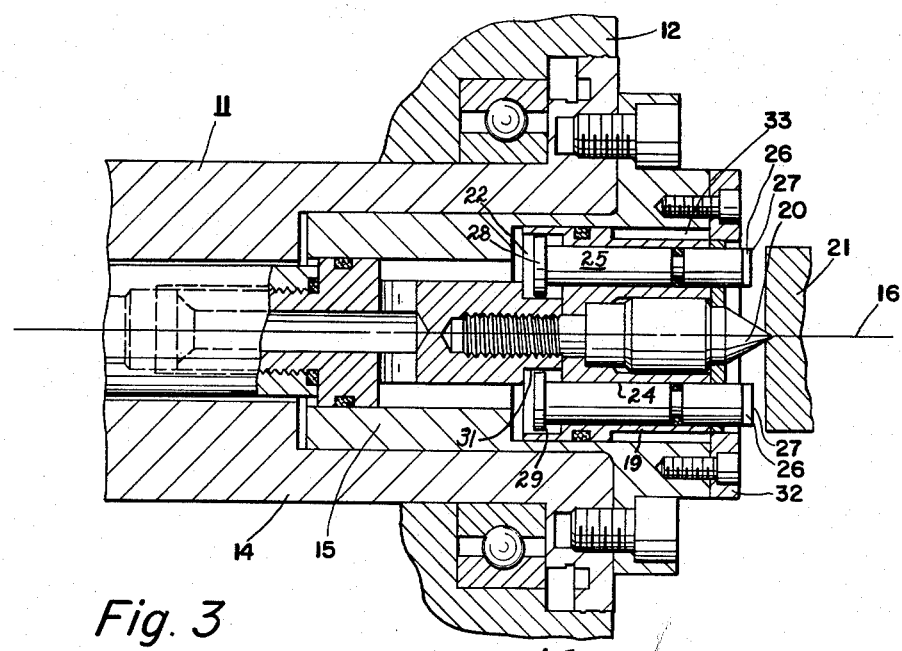
Fig. 3
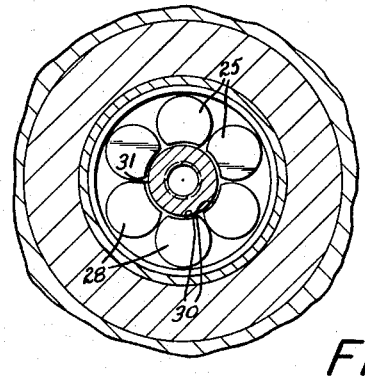
Fig. 2
Fig. 4
INVENTOR.
HARRY W. BROWN, SR.
BY Woodling, Krost,
Granger and Rust
ATTORNEYS › # United States Patent Office 3,177,745
Patented Apr. 13, 1965

3,177,745
SPINDLE CENTER AND DRIVER
Harry W. Brown, Sr., Willowick, Ohio, assignor to The
National Acme Company, a corporation of Ohio
Filed Sept. 25, 1962, Ser. No. 226,022
13 Claims. (Cl. 82—40)

The invention relates in general to a combined center and driver for a spindle and, more particularly, to a hydraulically actuated spindle center and work driver.

In the driving of workpieces, it is many times desired to provide rotational torque to the workpiece yet without engaging the outer peripheral surface of the workpiece, because this surface has previously been machined or is to be machined. Accordingly, the ordinary type of chuck or other work driver which grips the peripheral surface of the workpiece cannot be used. Accordingly, the spindle center and driver of the present invention may be employed for both centering the workpiece and independently to move driver plungers into engagement with the end face of the workpiece to provide the means to transmit the rotational torque to the workpiece.

An object of the invention is to provide a combined hydraulic center and driver for a rotatable spindle of a machine tool.

Another object of the invention is to provide a hydraulically actuated center and a hydraulically actuated plurality of driver plungers independently actuable to engage a workpiece.

Another object of the invention is to provide hydraulic means to advance a center and to independently advance driver plungers and a mechanical means to retract the driver plungers.

Another object of the invention is to provide a hydraulic combined center and driver with a dual piston arrangement, one for forward motion and the other for rearward motion.

The spindle center and driver of the invention may be embodied in a spindle journalled in a frame with a center axially movable in the frame and a plurality of driver plungers spaced around the center, hydraulic means to move the center in a forward axial direction and to independently move the driver plungers in a forward axial direction, means to move the center in a rearward axial direction, and mechanical means coacting with rearward movement of the center to move the driver plungers in a rearward axial direction.

Other objects and a fuller understanding of the invention may be had by referring to the following description and claims, taken in conjunction with the accompanying drawings, in which:

FIGURE 2 is a front view of the spindle;

FIGURE 3 is an enlarged partial sectional view of the front of the spindle; and, FIGURE 4 is a sectional view on line 4—4 of FIGURE 1.

Figure 1:
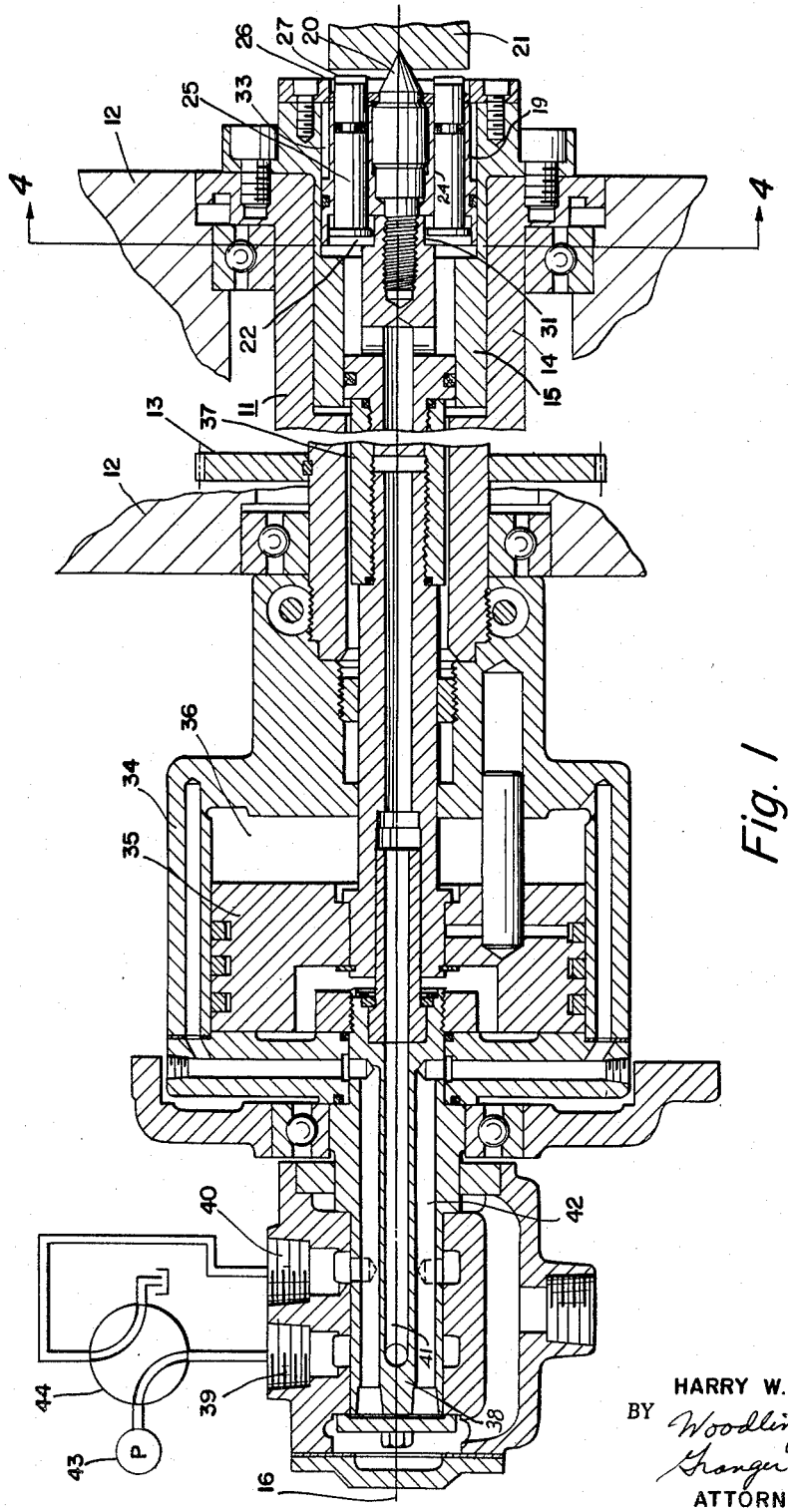
FIGURE 1 is a longitudinal sectional view of a spindle incorporating the combined center and driver of the invention.

The figures of the drawing show the combined center and driver of the invention as embodied, for purposes of illustration but not limitation, in a spindle 11. This spindle is journalled for rotation in a frame 12 which may be a frame of a machine tool. Means such as a gear 13 may be used to rotate the spindle from some drive means not shown. The front of the spindle has a hollow nose 14 with a first cylinder 15 carried in this nose 14. The spindle 11 has an axis 16 and the cylinder 15 is coaxial therewith. A first piston 19 is disposed in the cylinder 15 and carries a spindle center 20 on this forward end thereof. This is for centering a workpiece 21. The piston 19 and cylinder 15 together form a rearward chamber 22 to the rear of the piston 19.

A plurality of plunger cylinders 24 are formed in the piston 19 and in this case, six such plunger cylinders are shown. These plunger cylinders 24 are equally spaced around the center 20 and have axes parallel to the spindle axis 16. Driver plungers 25 are provided, one in each plunger cylinder. Each driver plunger 25 has an exposed forward outer end 26. A chisel point 27 is formed no each forward end 26 to bite into and drivingly engage the end face of the workpiece 21. Each driver plunger 25 has an enlarged head 28 disposed in the rearward chamber 22. The under surface 29 of each head 28 constitutes an abutment means engageable with the inner end of the first piston 19. Each head 28 has an arcuate recessed surface 30 forming a non-circular head 28 and this recessed surface 30 coacts with a cylindrical surface 31 on the first piston 19 to prevent rotation of the driver plunger 25 relative to the piston 19. This maintains the chisel points 27 substantially along radii from the axis 16.

Keys 32 are fixed to the front of the spindle 11 and the piston 19 has keyways 33 therein slidable along said keys 32 to insure rotation of said piston 19 with said spindle 11.

A second cylinder 34 is provided in the spindle 11 at the rear thereof. A second piston 35 is carried in this second cylinder 34 and establishes therewith a forward chamber 36 acting on the forward face of the piston 35. A draw rod 37 interconnects the pistons 19 and 35 and, thus, the two pistons act together as a single piston means. A rotating hydraulic distributor 38 is provided at the rear of the spindle 11. Stationary ports 39 and 40 are provided in the distributor 38 and lead to first and second hydraulic conduits 41 and 42, respectively. The first hydraulic conduit 41 extends through the draw rod 37 to the rearward chamber 22. The second hydraulic conduit 42 extends through the second cylinder 34 to the forward chamber 36. Means such as a pump 43 and a valve 44 may be provided to selectively supply hydraulic fluid under pressure to the first and second ports 39 and 40. The rear of the second cylinder 34 may be vented to atmosphere and the forward end of the first piston 19 is vented to atmosphere.

Operation

The FIGURE 1 shows the combined center and driver in the rearward position with the spindle center 20 retracted. In this position, a workpiece 21 would be held in position along the axis 16 for engagement of the predrilled conical hole therein with the spindle center 20. Next, the valve 44 would be moved to the position shown to apply hydraulic fluid pressure to the port 39 and through the first hydraulic conduit 41 to the rearward chamber 22. This may be considered a first chamber to establish forward movement and the forward chamber 36 may be considered a second chamber to establish rearward movement to the center 20. With hydraulic pressure in the first chamber 22, this acts on the piston 19 to move same forwardly and, accordingly, the center 20 moves forward for engagement with the workpiece 21 and is held thereagainst by the hydraulic pressure. The other end of the workpiece 21, it is assumed, is held in a tail stock center. This same hydraulic fluid pressure in the first chamber 22 also acts on the inner end surfaces of the heads 28 and forces the driver plungers 25 outwardly. This causes the chisel points 27 to bite into and drivingly engage the end face of the workpiece 21. Accordingly, when the spindle is rotated through the drive gear 13, the workpiece 21 will also be rotated.

On completion of machining of the workpiece 21, the workpiece is released by relieving pressure on port 39 and supplying pressure to port 40. This supplies fluid under pressure to the second or forward chamber 36 to move the second piston 35 rearwardly. This pulls on the draw rod 37 and retracts the piston 19 and center 20. There is no hydraulic pressure tending to retract the driver plungers 25, instead the under surface 29 of the heads 28 of the driver plungres 25 engage the rear face of the first piston 19 upon its retractile movement and, thus, these driver plungers 25 are mechanically retracted. Accordingly, it will be seen that the present invention provides a hydraulic means to provide forward movement to the center 20 and independently to the driver plungers 25. Also, hydraulic means is used to retract the center 20. A mechanical means is provided to retract the driver plungers 25 coacting with the last mentioned hydraulic means.

The first and second pistons 19 and 35 have been separated even through physically and directly interconnected by the draw rod 37. This physical separation permits a construction wherein only the rearward chamber 22 need be provided at the spindle nose 14 where space is at a premium and also establishes that the forward chamber 36 may be provided at the rear of the spindle 11 where space is more easily available.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A spindle center and driver comprising, in combination, a frame,
   a spindle journalled in said frame for rotation about an axis,
   a center axially movable in said spindle,
   hydraulic means including a movable piston to move said center in a forward axial direction,
   a plurality of movable driver plungers carried in said piston spaced around said center,
   said hydraulic means independently moving said driver plungers in a forward axial direction,
   means to move said center in a rearward axial direction,
   and mechanical means coacting with rearward movement of said center to move said driver plungers in a rearward axial direction.

2. A spindle center and driver comprising, in combination, a frame,
   a spindle journalled in said frame for rotation about an axis,
   a center in said spindle and axially movable therein,
   a plurality of driver plungers carried in said spindle equally spaced around said center and having axes substantially parallel to said spindle axis,
   first hydraulic means to move said center in a forward axial direction,
   second hydraulic means to move said driver plungers in a forward axial direction,
   third hydraulic means to move said center in a rearward axial direction,
   mechanical means coacting with said third hydraulic means to move said driver plungers in a rearward axial direction,
   and said mechanical means including abutment means on said driver plungers disposed to be acted on by rearward retractive movement of said third hydraulic means.

3. A spindle center and driver comprising, in combination, a frame,
   a spindle journalled in said frame for rotation about an axis,
   a center in said spindle and axially movable therein,
   a plurality of driver plungers carried in said spindle equally spaced around said center and having axes substantially parallel to said spindle axis,
   first hydraulic means to move said center in a forward axial direction,
   second hydraulic means to move said driver plungers in a forward axial direction,
   third hydraulic means to move said center in a rearward axial direction,
   mechanical means coacting with said third hydraulic means to move said driver plungers in a rearward axial direction,
   said first hydraulic means including piston and cylinder means,
   said driver plungers slidably carried in said piston means,
   said piston and cylinder means forming first and second chambers,
   and said mechanical means including heads on said driver plungers disposed in said first chamber to be acted on by fluid pressure of said second hydraulic means and to be acted on by said piston means upon rearward retractive movement of said piston means.

4. A combined hydraulic center and driver for a rotatable spindle of a machine tool comprising, in combination, a frame,
   a spindle journalled relative to said frame and having an axis,
   piston and cylinder means coaxially disposed in said spindle and relatively axially movable and establishing therebetween first and second chambers,
   a spindle center connected to be moved by said relative movement,
   a plurality of plunger cylinders in one of said piston and cylinder means and equally spaced around said spindle center with axes parallel to said spindle axis,
   a driver plunger in each of said plunger cylinders,
   an exposed driver end on each of said driver plungers,
   an inner surface on each of said driver plungers within said first chamber,
   abutment means on each said driver plunger engageable with the movable one of said piston and cylinder means,
   first and second hydraulic conduits within said spindle and connected to said first and second chambers, respectively,
   means to supply hydraulic fluid under pressure to said first hydraulic conduit and to said first chamber to exert a relatively forward axial force to move said center axially forward for engagement with any said workpiece and for exerting a relatively forward axial force on all said driver plungers to cause them to move forwardly to drivingly engage the end of any said workpiece,
   and means to supply fluid under pressure to said second hydraulic conduit and to said second chamber to exert a relatively rearward force to retract said center and all said driver plungers by engagement of said driver plunger abutment means on said movable one of said piston and cylinder means.

5. A combined hydraulic center and driver for a rotatable spindle of a machine tool comprising, in combination, a frame, a spindle journalled relative to said frame and having an axis,
cylinder means coaxially disposed in said spindle,
piston means in said cylinder means and establishing therewith first and second chambers,
a spindle center in said piston means,
a plurality of plunger cylinders in said piston means and equally spaced around said spindle center with axes parallel to said spindle axis,
a driver plunger in each of said plunger cylinders,
a pointed exposed outer end on each of said driver plungers,
an inner surface on each of said driver plungers within said first chamber,
abutment means on each said driver plunger engageable with said piston means,
first and second hydraulic conduits within said spindle and connected to said first and second chambers, respectively,
means to supply hydraulic fluid under pressure to said first hydraulic conduit and to said first chamber to exert a forward axial force on said piston means to move said center axially forward for engagement with any said workpiece and for exerting a forward axial force on all said driver plungers to cause them to move forwardly to bite into and drivingly engage the end face of any said workpiece,
and means to supply fluid under pressure to said second hydraulic conduit and to said second chamber to move said piston means rearwardly to retract said center and all said driver plungers by engagement of said driver plunger abutment means on said piston means.

6. A combined hydraulic center and driver for a rotatable spindle of a machine tool comprising, in combination, a frame,
a spindle journalled relative to said frame and having an axis,
piston and cylinder means coaxially disposed in said spindle and relatively axially movable and establishing therebetween first and second chambers,
a spindle center in one of said piston and cylinder means and connected to be moved by said relative movement,
a plurality of plunger cylinders in a movable one of said piston and cylinder means and equally spaced around said spindle center with axes parallel to said spindle axis,
a driver plunger in each of said plunger cylinders,
a pointed exposed outer end on each of said driver plungers,
a head on each of said driver plungers within said first chamber,
first and second hydraulic conduits within said spindle and connected to said first and second chambers, respectively,
means to supply hydraulic fluid under pressure through said first hydraulic conduit to said first chamber to exert a relatively forward axial force to move said center axially forward for engagement with any said workpiece and for exerting a relatively forward axial force on all said driver plungers to cause them to move forwardly to bite into and drivingly engage the end face of any said workpiece,
and means to supply fluid under pressure through said second hydraulic conduit to said second chamber to exert a relatively rearward force to retract said center and all said driver plungers by engagement of said driver plunger heads on said movable one of said piston and cylinder means.

7. A combined hydraulic center and driver for a rotatable spindle of a machine tool comprising, in combination, a frame
a spindle journalled relative to said frame and having an axis,
cylinder means coaxially disposed in said spindle,
piston means in said cylinder means and establishing therewith first and second chambers,
a spindle center in said piston means,
a plurality of plunger cylinders in said piston means and equally spaced around said spindle center with axes parallel to said spindle axis,
a driver plunger in each of said plunger cylinders,
a pointed exposed outer end on each of said driver plungers,
a head on each of said driver plungers within said first chamber,
first and second hydraulic conduits within said spindle and connected to said first and second chambers, respectively,
means to supply hydraulic fluid under pressure through said first hydraulic conduit to said first chamber to exert a forward axial force on said piston means to move said center axially forward for engagement with any said workpiece and for exerting a forward axial force on all said driver plungers to cause them to move forwardly to bite into and drivingly engage the end face of any said workpiece,
and means to supply fluid under pressure through said second hydraulic conduit to said second chamber to move said piston means rearwardly to retract said center and all said driver plungers by engagement of said driver plunger heads on said piston means.

8. A combined hydraulic center and driver for a rotatable spindle of a machine tool comprising, in combination, a frame,
a spindle journalled relative to said frame and having an axis,
cylinder means coaxially disposed in said spindle,
piston means in said cylinder means and establishing therewith forward and rearward chamber means,
a spindle center in said piston means,
a plurality of plunger cylinders in said piston means and equally spaced around said spindle center with axes parallel to said spindle axis,
a driver plunger in each of said plunger cylinders,
a pointed exposed outer end on each of said driver plungers,
a head on each of said driver plungers within said rearward chamber means,
first and second hydraulic conduits within said spindle and connected to said rearward and forward chamber means, respectively,
means to supply hydraulic fluid under pressure to said first hydraulic conduit and to said rearward chamber means to exert a forward axial force on said piston means to move said center axially forward for engagement with any said workpiece and for exerting a forward axial force on all said driver plungers to cause them to move forwardly to bite into and drivingly engage the end face of any said workpiece,
and means to supply fluid under pressure to said second hydraulic conduit and to said forward chamber means to move said piston means rearwardly to retract said center and all said driver plungers by engagement of said driver plunger heads on said piston means.

9. A combined hydraulic center and driver for a rotatable spindle of a machine tool comprising, in combination, a frame,
a spindle journalled relative to said frame and having an axis,
cylinder means coaxially disposed in said spindle,
piston means in said cylinder means and establishing therewith forward and rearward chambers,
a spindle center fixed in said piston means,
a plurality of plunger cylinders in said piston means and equally spaced around said spindle center with axes parallel to said spindle axis, a driver plunger in each of said plunger cylinders,
a pointed exposed outer end on each of said driver plungers,
an inboard end on each of said driver plungers within said rearward chamber,
a head on each said inboard end,
a rotating distributor at the rear of said spindle,
first and second hydraulic conduits within said spindle and connected to said distributor and to said rearward and forward chambers, respectively,
means to supply hydraulic fluid under pressure through said distributor to said first hydraulic conduit and to said rearward chamber to exert a forward axial force on said piston means to move said center axially forward for engagement with any said workpiece and for exerting a forward axial force on all said driver plungers to cause them to move forwardly to bite into and drivingly engage the end face of any said workpiece,
and means to supply fluid under pressure through said distributor to said second hydraulic conduit and to said forward chamber to move said piston means rearwardly to retract said center and all said driver plungers by engagement of said driver plunger heads on said piston means.

10. A combined hydraulic center and driver for a rotatable spindle of a machine tool comprising, in combination, a frame,
a spindle journalled relative to said frame and having an axis,
a nose in the front of said spindle,
a first cylinder coaxially disposed in said nose,
a first piston in said first cylinder and establishing therewith a rearward chamber,
a spindle center fixed in said first piston,
a plurality of plunger cylinders equally spaced around said spindle center with axes parallel to said spindle axis,
a driver plunger in each of said plunger cylinders and each having an exposed outer end and an inboard end,
a chisel point on the exposed outer end of each of said driver plungers disposed substantially along radii from said spindle axis,
a head on the inboard end of each of said driver plungers within said rearward chamber,
a non-circular surface on the heads of said driver plungers coacting with said first piston to prevent rotation of said driver plungers relative to said first piston,
a second cylinder located in the rear of said spindle,
a second piston in said second cylinder and establishing therewith a forward chamber,
means interconnecting said first and second pistons disposed in said spindle,
a rotating distributor at the rear of said spindle,
first and second hydraulic conduits within said spindle and connected to said distributor,
said first hydraulic conduit leading to said rearward chamber of said first cylinder,
said second hydraulic conduit leading to said forward chamber of said second cylinder,
means to supply hydraulic fluid under pressure through said distributor to said first hydraulic conduit and to said rearward chamber to exert a forward axial force on said first piston to move said center axially forward for engagement with any said workpiece and for exerting a forward axial force on all said driver plungers to cause them to move forwardly to bite into and drivingly engage the end face of any said workpiece,
and means to supply fluid under pressure through said distributor to said second hydraulic conduit and to said forward chamber of said second cylinder to move said first and second pistons rearwardly to retract said center and all said driver plungers.

11. A combined hydraulic center and driver for a rotatable spindle of a machine tool comprising, in combination, a frame,
a spindle journalled relative to said frame and having an axis,
a hollow nose in the front of said spindle,
a first cylinder coaxially disposed in said hollow nose,
a first piston in said first cylinder and establishing therewith a rearward chamber,
a spindle center fixed in said first piston,
a plurality of six plunger cylinders in said first piston and equally spaced around said spindle center with axes parallel to said spindle axis,
a driver plunger in each of said plunger cylinders and each having an exposed outer end and an inboard end,
a chisel point on the exposed outer end of each of said driver plungers disposed substantially along radii from said spindle axis,
a head on the inboard end of each of said driver plungers within said rearward chamber,
a non-circular surface on the heads of said driver plungers coacting with said first piston to prevent rotation of said driver plungers relative to said first piston,
a second cylinder located in the rear of said spindle,
a second piston in said second cylinder and establishing therewith a forward chamber,
a draw rod interconnecting said first and second pistons coaxially disposed in said spindle,
a rotating distributor at the rear of said spindle,
first and second hydraulic conduits within said spindle and connected to said distributor,
said first hydraulic conduit extending through said draw rod and leading to said rearward chamber of said first cylinder,
said second hydraulic conduit leading to said forward chamber of said second cylinder,
means to supply hydraulic fluid under pressure through said distributor to said first hydraulic conduit and to said rearward chamber to exert a forward axial force on said first piston to move said center axially forward for engagement with any said workpiece and for exerting a forward axial force on all six of said driver plungers to cause them to move forwardly to bite into and drivingly engage the end face of any said workpiece,
and means to supply fluid under pressure through said distributor to said second hydraulic conduit and to said forward chamber of said second cylinder to move said second piston rearwardly and through said draw rod to move said first piston rearwardly to retract said center and all said driver plungers by engagement of said driver plunger heads on said first piston.

12. A spindle center and driver comprising, in combination, a frame,
a spindle journalled in said frame for rotation about an axis, a piston in said spindle,
a center in said piston and axially movable therein,
a plurality of driver plungers carried in said piston spaced around said center,
first hydraulic means including said piston to move said center in forward and rearward axial directions,
second hydraulic means to move said driver plungers in a forward axial direction,
and mechanical means coacting with said first hydraulic means to move said driver plungers in a rearward axial direction.

13. A spindle center and driver comprising, in combination, a frame,
a spindle journalled in said frame for rotation about an axis,
a center in said spindle and axially movable therein, a plurality of driver plungers carried in said spindle spaced around said center, hydraulic means to move said center in forward and rearward axial directions, means to move said driver plungers in a forward axial direction, said hydraulic means including piston and cylinder means, said driver plungers slidably carried in said piston means, an abutment means on said driver plungers disposed to be acted on by said piston means upon rearward axial movement of said piston means.

References Cited by the Examiner

UNITED STATES PATENTS 2,643,571   6/53   Bullard.
3,052,272   9/62   Yock _____ 144—209

WILLIAM W. DYER, JR., *Primary Examiner.*